United States Patent
Yoshioka

(10) Patent No.: US 6,561,423 B2
(45) Date of Patent: May 13, 2003

(54) METHOD AND APPARATUS FOR GENERATING OPTICALLY READABLE DOT IMAGE DATA AND RECORDING MEDIUM

(75) Inventor: Kenji Yoshioka, Hachioji (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/780,451

(22) Filed: Feb. 9, 2001

(65) Prior Publication Data

US 2001/0028000 A1 Oct. 11, 2001

(30) Foreign Application Priority Data

Apr. 10, 2000 (JP) .................................... 2000-108169

(51) Int. Cl.⁷ .................................................. G06K 7/10
(52) U.S. Cl. .............. 235/454; 235/462.15; 235/462.25
(58) Field of Search ................................ 235/454, 455, 235/456, 462.01, 462.03, 462.07, 462.11, 462.14, 462.15, 462.25

(56) References Cited

U.S. PATENT DOCUMENTS

| | | | |
|---|---|---|---|
| 5,288,986 A | * | 2/1994 | Pine et al. .................. 235/494 |
| 5,541,396 A | * | 7/1996 | Rentsch ...................... 235/454 |
| 5,638,463 A | * | 6/1997 | Ohshita ...................... 382/195 |
| 5,886,335 A | * | 3/1999 | Matsuada ................... 235/436 |
| 5,896,403 A | | 4/1999 | Nagasaki et al. |
| 6,014,501 A | | 1/2000 | Fukuda et al. |
| 6,098,882 A | | 8/2000 | Antognini et al. |
| 6,267,296 B1 | * | 7/2001 | Ooshima et al. ............ 235/487 |

\* cited by examiner

*Primary Examiner*—Daniel St. Cyr
(74) *Attorney, Agent, or Firm*—Frishauf, Holtz, Goodman & Chick, P.C.

(57) ABSTRACT

The present invention selects an appropriate composition pattern even if there is provided a plurality of composition patterns for dot image data based on the number of pixels associated with printing. Namely, in order to print a readable dot, an image data generation method is used for setting a composition pattern of this dot. This method determines the number of pixels associated with printout of the composition pattern in consideration of enlargement of the dot when printed. This method also uses a composition pattern which minimizes dispersion of pixels constituting the corresponding dot. By doing so, the method uniquely determines an optimal dot composition pattern for printing.

11 Claims, 13 Drawing Sheets

| IMAGESETTER RESOLUTION (DPI) | SPECIFIED VALUE | | DOT COMPOSITION PATTERN OF PIXELS |
|---|---|---|---|
| | ONE-PIXEL SIZE L (μm) | NUMBER OF PIXELS PER VIRTUAL CELL SIDE | DOT PITH L (μm) |
| 2400 | 10.6 | 6 | 63.5 |
| 2540 | 10 | 6 | 60 |
| 3000 | 8.5 | 7 | 59.3 |

FIG. 4 (PRIOR ART)

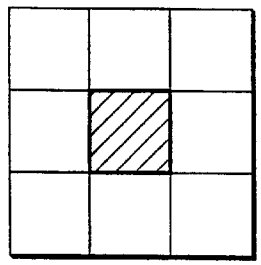
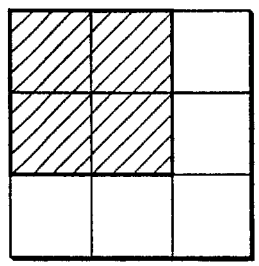
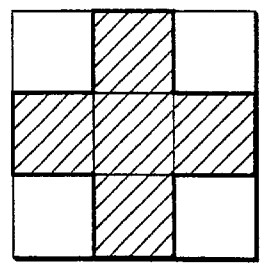
F I G. 5A
(PRIOR ART)
F I G. 5B
(PRIOR ART)
F I G. 5C
(PRIOR ART)
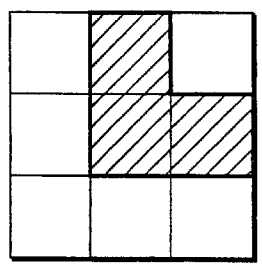
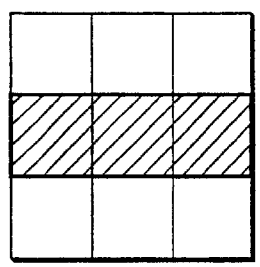
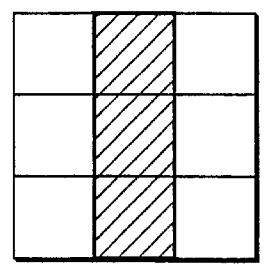
F I G. 6A
(PRIOR ART)
F I G. 6B
(PRIOR ART)
F I G. 6C
(PRIOR ART)

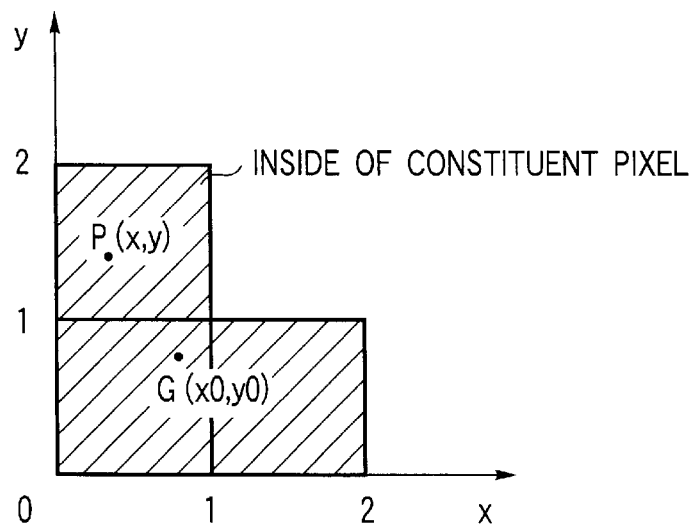
FIG. 8
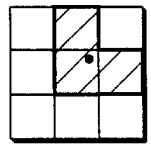 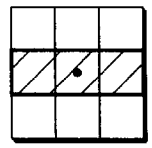 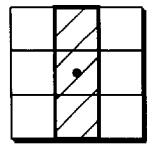
FIG. 9A    FIG. 9B    FIG. 9C
IMAGESETTER'S LASER SCAN DIRECTION
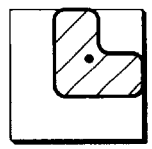 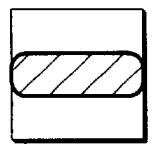 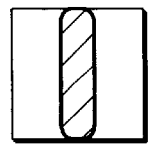
FIG. 10A    FIG. 10B    FIG. 10C IMAGESETTER'S LASER SCAN DIRECTION
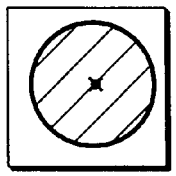 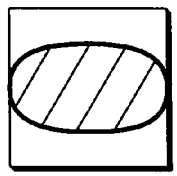 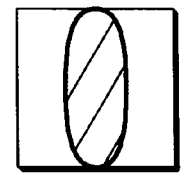
FIG. 11A  FIG. 11B  FIG. 11C
IMAGESETTER'S LASER SCAN DIRECTION
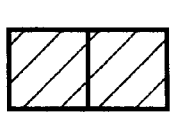　　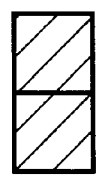
FIG. 12A　　FIG. 12B
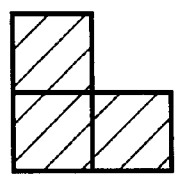　　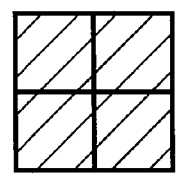
FIG. 13　　FIG. 14

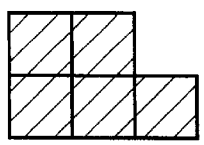
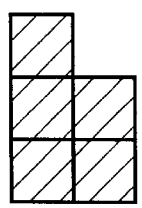
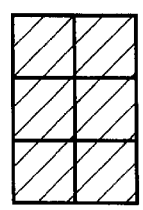
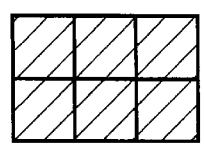
FIG. 15A  FIG. 15B  FIG. 16A  FIG. 16B
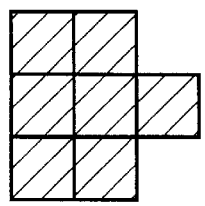
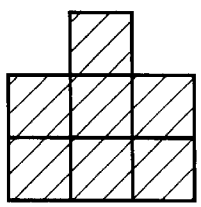
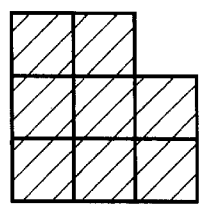
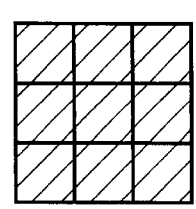
FIG. 17A  FIG. 17B  FIG. 18  FIG. 19
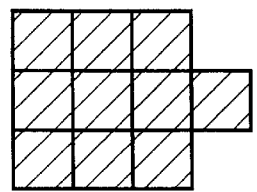
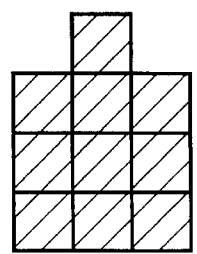
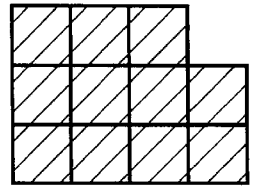
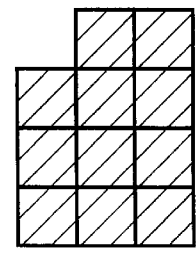
FIG. 20A  FIG. 20B  FIG. 21A  FIG. 21B
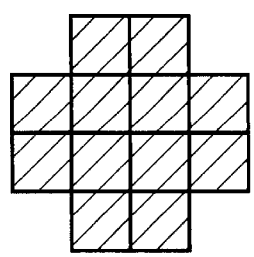
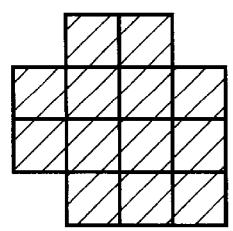
FIG. 22  FIG. 23

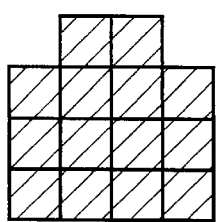
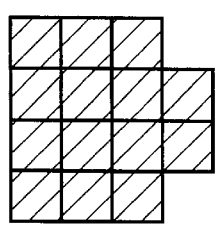
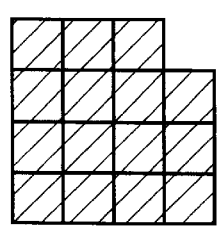
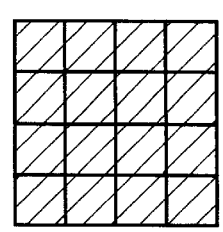
FIG. 24A    FIG. 24B    FIG. 25    FIG. 26
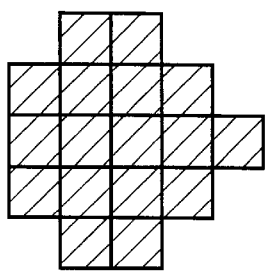
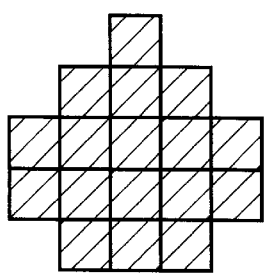
FIG. 27A              FIG. 27B
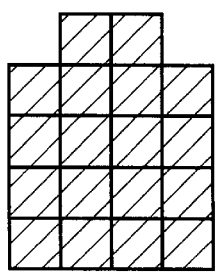
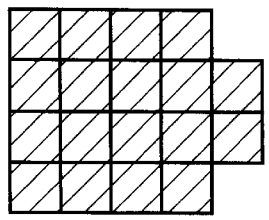
FIG. 28A              FIG. 28B
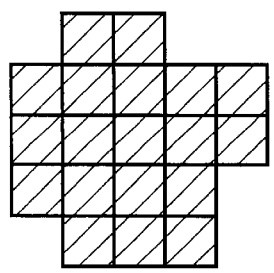
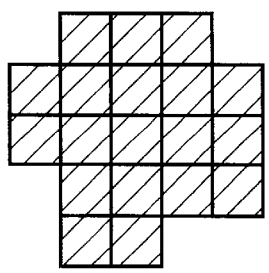
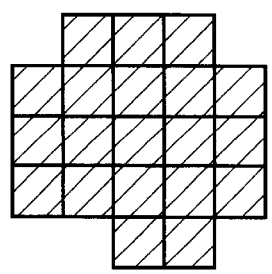
FIG. 29A    FIG. 29B    FIG. 30

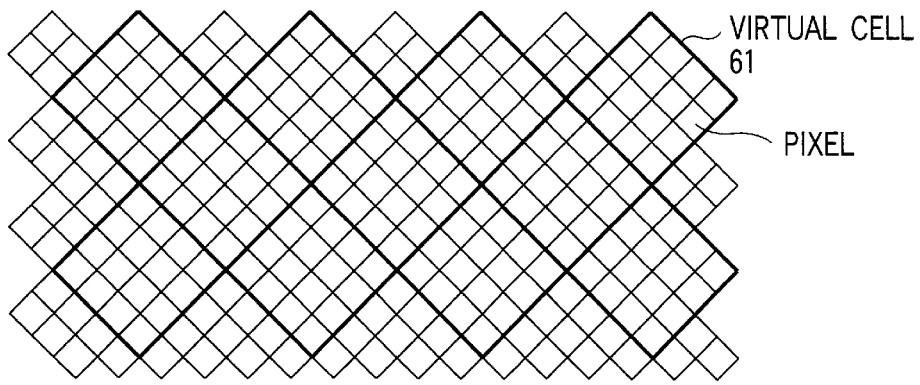
F I G. 37A
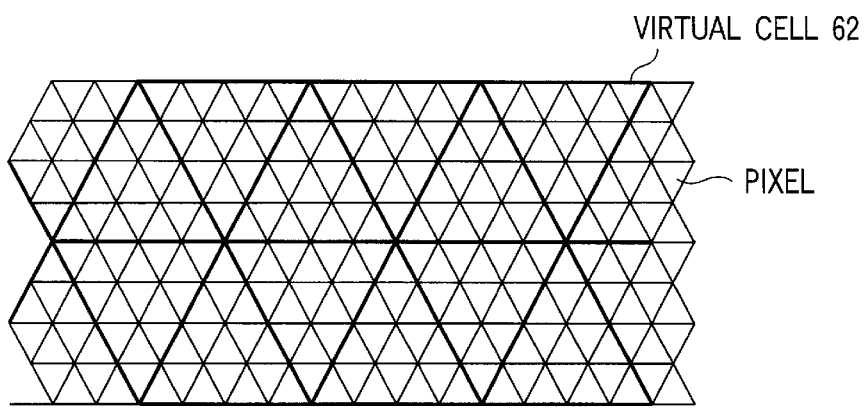
F I G. 37B
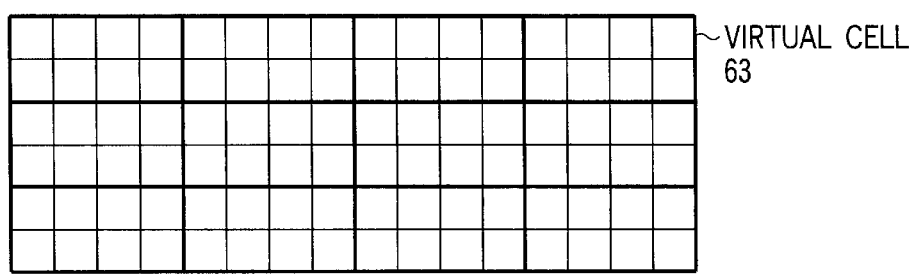
F I G. 37C

METHOD AND APPARATUS FOR GENERATING OPTICALLY READABLE DOT IMAGE DATA AND RECORDING MEDIUM

CROSS-REFERENCE TO RELATED APPLICATIONS

This application is based upon and claims the benefit of priority from the prior Japanese Patent Application No. 2000-108169, filed Apr. 10, 2000, the entire contents of which are incorporated herein by reference.

BACKGROUND OF THE INVENTION

The present invention generally relates to a method and an apparatus for generating optically readable image data comprising dots which are printed on a printout medium. The present invention also relates to a computer-readable recording medium which stores programs including instructions for a computer to perform operations of such an image data generation apparatus.

Conventionally, as disclosed in U.S. Pat. No. 5,896,403 and U.S. Pat. No. Re 36,589, various technologies are developed and are already known for printing data including voices, images, and other types of information on a printout medium such as paper and the like in the form of optically readable dots.

FIG. 1 shows a plurality of adjacent virtual cells 200 virtually formed in a matrix on a printout medium. A partially enlarged view of these cells is shown at the left-bottom corner in FIG. 1.

Binary data 1 or 0 corresponds to presence or absence of an optically readable dot. A given dot is placed on a corresponding virtual cell and is printed on a printout medium. A special reader optically reads this printed dot to restore original binary data or reproduce a voice, for example.

The following describes this more specifically.

Data including voices, images, and other types of information is printed as an optically readable dot code 170 on a printout medium such as paper. The dot code 170 comprises a plurality of blocks 272.

Each block 272 comprises a data dot 282, a marker 174, and a block address 280. Data such as voice is divided into blocks each of which represents 1 or 0 as a data value. In a data area 180, the data dot 282 is placed as a black or white dot image according to a specified arrangement mode.

The marker 174 is used to find a reference point for detecting each data dot 282. The marker 174 is placed at four corners of each block 272 and comprises a specified number of consecutive black dots. The block address 280 is placed between markers 174 for identifying a plurality of different blocks 272 during reading. The block address 280 contains an error detection or correction sign.

In FIG. 1, a black dot is actually printed; no white dot is printed. A white dot corresponds to the ground color of a printout medium. A virtual cell is formed by virtual vertical and horizontal lines.

FIG. 2 is a functional block diagram of a reader for optically reading the dot code 170 by manual scanning.

As shown in FIG. 2, an output from a read unit 204 is connected to an input to a digitizing image memory 206 via a digitizing unit 205. An output from the digitizing image memory 206 is connected to an input to a reproduction unit 209 via a restoration unit 207 and a demodulation unit 208.

The read unit 204 comprises an illumination unit 201, an optical system 202, and an image pickup unit 203. The illumination unit 201 comprises an LED and the like for illuminating the dot code 170. The optical system 202 forms an image using reflected light from the dot code 170. The image pickup unit 203 comprises an area sensor such as CCD and the like for picking imaging light from the optical system 202.

The read unit 204 reads an image comprising dot codes. The digitizing unit 205 digitizes an imaging signal output from the read unit 204 according to a specified digitizing threshold value.

The digitizing image memory 206 stores the image data digitized in the digitizing unit 205.

The restoration unit 207 reads the digitized image data stored in the digitizing image memory 206 and detects the dots. The restoration unit 207 allocates a value of 1 or 0 to each of the detected dots and outputs the data.

The demodulation unit 208 demodulates data output from the restoration unit 207. The reproduction unit 209 performs error correction using the Reed-Solomon code or the like and, for example, expands the error-corrected data for reproducing original data such as voices.

In this configuration, the restoration unit 207 reads the digitized image data stored in the digitizing image memory 206. When detecting each dot, the restoration unit 207 finds the marker 174 from the digitized image data. The restoration unit 207 then finds a dot read reference position based on the centroid position of the marker 174.

Based on the corresponding dot read reference position, the restoration unit 207 detects a dot read point for reading each data dot 282 in the data area 180. The restoration unit 207 determines whether the detected data dot 282 is white or black. Based on this result, the restoration unit 207 allocates the value 1 or 0 to the data dot and outputs the data.

When the dot code 170 is printed, for example, input data to be printed such as voice is modulated beforehand. The demodulation unit 208 restores the modulated data to the original data before modulation.

The restoration unit 207 previously performs this modulation for easily finding the marker 174 first. The modulation is applied to the input data such as voice so that the number of consecutive black dots becomes smaller in the data dot 282 than in the marker 174. The modulation is performed for making a distinction between each data dot 282 and the marker 174 in the data area 180.

For printing the above-mentioned dot code 170, an image processing system such as a computer or a workstation is used to create image data for dot codes by processing information to be recorded. The corresponding image data is output to a typesetting device such as an imagesetter to create an image set copy. Thus, the dot code 170 is finally printed.

The following describes a system configuration for printing the dot code 170 with reference to FIG. 3A. In FIG. 3A, voice or image information to be dot-coded is input to a computer from an input device 100.

The computer 102 references a data compression system, an error correction system, format information of the dot code 170 and the like stored in an external storage device 104. The input signal is converted to image information to be output to an imagesetter 106. This image information is supplied to the imagesetter 106. The dot code 170 is then imaged on a film. A typesetting exposure device 108 exposes this film onto an image set copy. The thus created image set copy is printed from a printer 110 to create a printout which records the dot code 170 in a printed form.

FIG. 3B shows a device which can directly create an image set copy without imaging on films.

When the virtual cell is virtually formed on paper, the virtual cell size depends on a resolution specific to a typesetting device (imagesetter) to be used actually. When a specified virtual cell comprises a plurality of pixels, dot image data needs to be created for determining how many pixels should be associated with actual dot printing. It is also known that creation of the dot image data needs to consider enlargement of the corresponding dot (hereafter referred to as the dot gain) when it is actually printed on paper.

These items are already proposed by the applicant in U.S. Pat. No. 6,014,501. The following describes them in detail with reference to FIG. 4.

FIG. 4 shows a reference table for defining a composition pattern of pixels constituting dot image data according to a dot gain. The dot gain depends on an imagesetter resolution and characteristics of a printer, paper, and ink to be used actually. As disclosed in U.S. Pat. No. 6,014,501, a dot to be printed may occupy approximately 50% to 80% of one virtual cell including the dot enlargement.

Conditions of easily enlarging dots include a rotary press printer for fast printing on both sides of paper, easily bleeding rough paper, and less viscous ink. When dots easily enlarge, namely the dot gain is large, a composition pattern should contain few pixels associated with printing (rightmost "large" or "extra-large" in FIG. 4).

Conditions of preventing dots from enlarging include a sheet-fed press printer, hardly bleeding paper such as high-quality coated paper, and more viscous ink. When dots hardly enlarge, namely the dot gain is small, a composition pattern should contain many pixels associated with printing (leftmost "small" in FIG. 4).

FIG. 4 shows an example of creating dot image data at a dot pitch of approximately 60 μm. This example uses imagesetter resolutions of 2400 dpi, 2540 dpi, and 3000 dpi. At 2400 dpi, one pixel is sized 10.6 μm. To approximate 60 μm, 6 pixels are used to create a dot pitch of 63.5 μm. At 2540 dpi, one pixel is sized 10 μm. Just 6 pixels are used to create a dot pitch of 60 μm. At 3000 dpi, one pixel is sized 8.5 μm. To approximate 60 μm, 7 pixels are used to create a dot pitch of 59.3 μm.

A circle is an ideal shape for a composition pattern of pixels constituting dot image data. However, it is difficult to form an ideal circle unless the resolution is extremely high. Accordingly, as shown in FIG. 4, an actual composition pattern forms a square (S for square) comprising 4 by 4, 5 by 5, or 6 by 6 pixels. Alternatively, it forms a rounded square (c for circle) by eliminating four corners from the corresponding square.

In the course of operations based on the above-mentioned principle, the dot image data generation method disclosed in U.S. Pat. No. 6,014,501 causes the following problems.

FIGS. 5A through 6C show composition patterns of pixels for 1-dot image data placed in one virtual cell when an imagesetter at 1200 dpi is used for creating an image set copy of dot codes. One pixel at 1200 dpi provides a pitch of 21.6 μm. To provide a dot pitch approximate to 60 μm, it is necessary to use 3 pixels to create a dot pitch of 63.5 μm.

According to the technique disclosed in the above-mentioned U.S. Pat. No. 6,014,501, there are provided three patterns in FIGS. 5A through 5C in order to form a dot image data shape approximate to a square or a circle.

As the experiment proceeds, however, it has become apparent that none of the patterns in FIGS. 5A through 5C provides an appropriate number of pixels associated with printing based on the principle that dot enlargement should be considered for setting dot image data.

Namely, when dot printing is associated with 1 pixel (FIG. 5A), the printed dot is too fine. When dot printing is associated with 4 pixels (FIG. 5B) or 5 pixels (FIG. 5C), the printed dot is too thick.

As an experiment result, it has become apparent that 3 pixels are optimal for dot printout. When dot printing is associated with 3 pixels, there are three possible patterns as shown in FIGS. 6A through 6C. None of these composition patterns provides a shape approximate to a square or circle.

Accordingly, the technique disclosed in U.S. Pat. No. 6,014,501, alone could not select an optimal composition pattern. It may be possible to determine the number of pixels to be associated with printing out of a plurality of pixels which constitutes one virtual cell in the dot image data. Nevertheless, there may be provided a plurality of dot composition patterns each of which comprises the same number of pixels. There arises a new problem that it is further necessary to determine which composition pattern should be selected.

BRIEF SUMMARY OF THE INVENTION

The present invention has been made in consideration of the foregoing. It is therefore an object of the present invention to provide a method and an apparatus for generating optically readable dot image data and a recording medium, in which it is possible to select an optimal composition pattern out of a plurality of composition patterns for dot image data based on the number of pixels associated with printing even if a plurality of pixels constitutes a virtual cell for single dot image data and the virtual cell contains the specified number of pixels associated with actual printout of a single dot.

To achieve the above-mentioned purpose, a first mode of the present invention provides a method for generating optically readable dot image data when binary data corresponds to presence or absence of an optically readable dot and the dot is printed in a virtual cell virtually formed on a printout medium, comprising: a first step of determining the number of pixels constituting the virtual cell as a minimum print unit in a typesetting device used for printing the dot on a printout medium; a second step of determining the number of pixels in the virtual cell associated with printout of the dot in consideration of enlargement of the dot when printed on a printout medium based on the dot image data; and a third step of selecting a composition pattern which minimizes dispersion of pixels constituting the dot image data when a plurality of composition patterns is available as composition patterns for dot image data comprising the number of pixels determined by the second step.

A second mode there of provides an apparatus for generating optically readable dot image data when binary data corresponds to presence or absence of an optically readable dot and the dot is printed in a virtual cell virtually formed on a printout medium, comprising: first means for determining the number of pixels constituting the virtual cell as a minimum print unit in a typesetting device used for printing the dot on a printout medium; second means for determining the number of pixels in the virtual cell associated with printout of the dot in consideration of enlargement of the dot when printed on a printout medium based on the dot image data; and third means for selecting a composition pattern which minimizes dispersion of pixels constituting the dot image data when a plurality of composition patterns is available as composition patterns for dot image data comprising the number of pixels determined by the second means.

In order to generate optically readable dot image data when binary data corresponds to presence or absence of an optically readable dot and the dot is printed in a virtual cell virtually formed on a printout medium, a third mode thereof provides a computer-readable recording medium which stores programs including instructions for a computer to perform: a first process for determining the number of pixels constituting the virtual cell as a minimum print unit in a typesetting device used for printing the dot on a printout medium; a second process for determining the number of pixels in the virtual cell associated with printout of the dot in consideration of enlargement of the dot when printed on a printout medium based on the dot image data; and a third process for selecting a composition pattern which minimizes dispersion of pixels constituting the dot image data when a plurality of composition patterns is available as composition patterns for dot image data comprising the number of pixels determined by the second process.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 4 shows an example of a reference table for setting a composition pattern of pixels constituting dot image data according to a dot gain determined by an imagesetter resolution and characteristics of a printer, paper, and ink to be used actually;

FIGS. 5A through 5C show pixel composition patterns for 1-dot image data placed in one virtual cell when a 1200-dpi imagesetter is used for creating an image set copy of a dot code;

FIGS. 6A through 6C show pixel composition patterns for 1-dot image data placed in one virtual cell when a 1200-dpi imagesetter is used for creating an image set copy of a dot code;

FIG. 8 shows a dispersion of pixels constituting the dot image data, and more detail, schematically shows performing area-integration on the square of the distance between a position of each pixel constituting a dot and a centroid position based on all pixels constituting the dot within all pixels constituting the dot;

FIGS. 9A through 9C show composition pattern of the pixels on three dot image data;

FIGS. 10A through 10C show a configuration of dot outputted from an imagesetter;

FIGS. 11A through 11C show a configuration of printed dot;

FIGS. 12A and 12B show composition patterns for dot image data in order to minimize the above-mentioned dispersion value when the number of pixels (N) constituting a dot is 2;

FIG. 13 shows a composition pattern for dot image data in order to minimize the above-mentioned dispersion value when the number of pixels (N) constituting a dot is 3;

FIG. 14 shows a composition pattern for dot image data in order to minimize the above-mentioned dispersion value when the number of pixels (N) constituting a dot is 4;

FIGS. 15A and 15B show composition patterns for dot image data in order to minimize the above-mentioned dispersion value when the number of pixels (N) constituting a dot is 5;

FIGS. 16A and 16B show composition patterns for dot image data in order to minimize the above-mentioned dispersion value when the number of pixels (N) constituting a dot is 6;

FIGS. 17A and 17B show composition patterns for dot image data in order to minimize the above-mentioned dispersion value when the number of pixels (N) constituting a dot is 7;

FIG. 18 shows a composition pattern for dot image data in order to minimize the above-mentioned dispersion value when the number of pixels (N) constituting a dot is 8;

FIG. 19 shows a composition pattern for dot image data in order to minimize the above-mentioned dispersion value when the number of pixels (N) constituting a dot is 9;

FIGS. 20A and 20B show composition patterns for dot image data in order to minimize the above-mentioned dispersion value when the number of pixels (N) constituting a dot is 10;

FIGS. 21A and 21B show composition patterns for dot image data in order to minimize the above-mentioned dispersion value when the number of pixels (N) constituting a dot is 11;

FIG. 22 shows a composition pattern for dot image data in order to minimize the above-mentioned dispersion value when the number of pixels (N) constituting a dot is 12;

FIG. 23 shows a composition pattern for dot image data in order to minimize the above-mentioned dispersion value when the number of pixels (N) constituting a dot is 13;

FIGS. 24A and 24B show composition patterns for dot image data in order to minimize the above-mentioned dispersion value when the number of pixels (N) constituting a dot is 14;

FIG. 25 shows a composition pattern for dot image data in order to minimize the above-mentioned dispersion value when the number of pixels (N) constituting a dot is 15;

FIG. 26 shows a composition pattern for dot image data in order to minimize the above-mentioned dispersion value when the number of pixels (N) constituting a dot is 16;

FIGS. 27A and 27B show composition patterns for dot image data in order to minimize the above-mentioned dispersion value when the number of pixels (N) constituting a dot is 17;

FIGS. 28A and 28B show composition patterns for dot image data in order to minimize the above-mentioned dispersion value when the number of pixels (N) constituting a dot is 18;

FIGS. 29A and 29B show composition patterns for dot image data in order to minimize the above-mentioned dispersion value when the number of pixels (N) constituting a dot is 19;

FIG. 30 shows a composition pattern for dot image data in order to minimize the above-mentioned dispersion value when the number of pixels (N) constituting a dot is 20;

FIGS. 37A through 37C show configurations of virtual cell comprising non-square pixels.

DETAILED DESCRIPTION OF THE INVENTION

Figure 1:
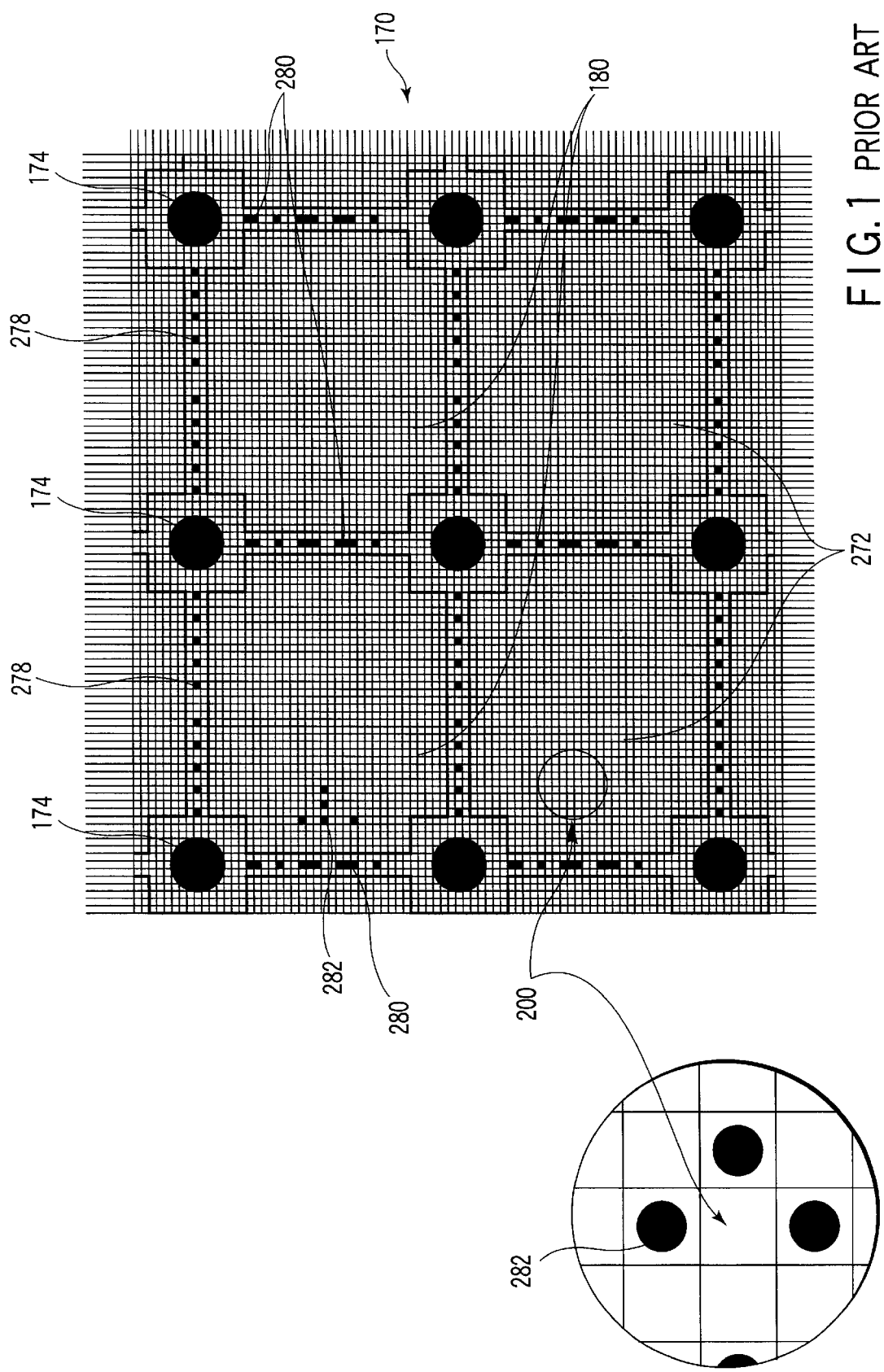
FIG. 1 shows a plurality of adjacent virtual cells 200 virtually formed in a matrix on a printout medium.
Figure 2:
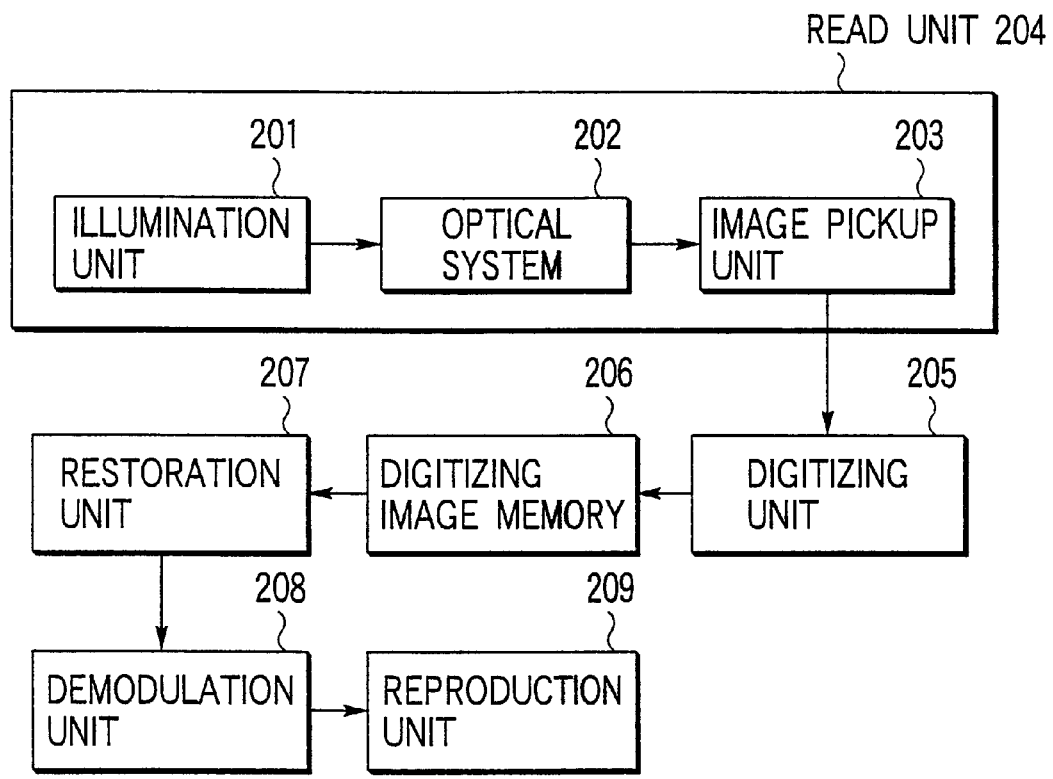
FIG. 2 is a functional block diagram of a reader 100 for optically reading a dot code 170 by manual scanning.
Figure 3A:
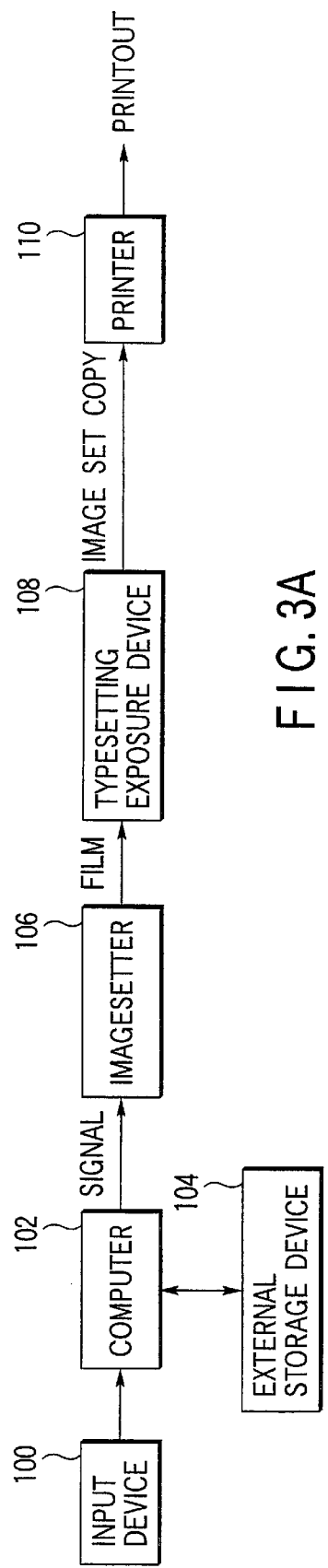
FIGS. 3A and 3B show print system configurations for dot codes.
Figure 3B:
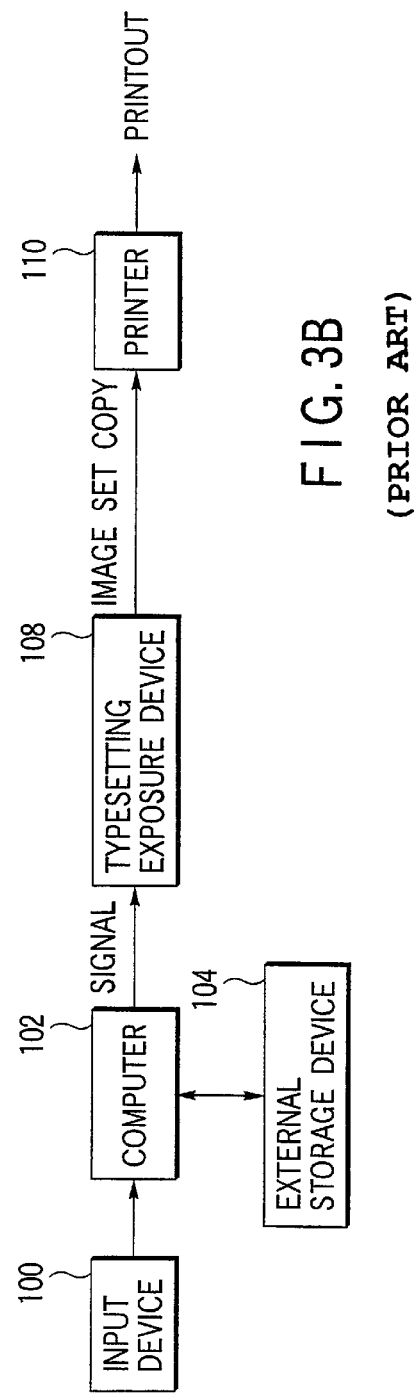
Figure 7:
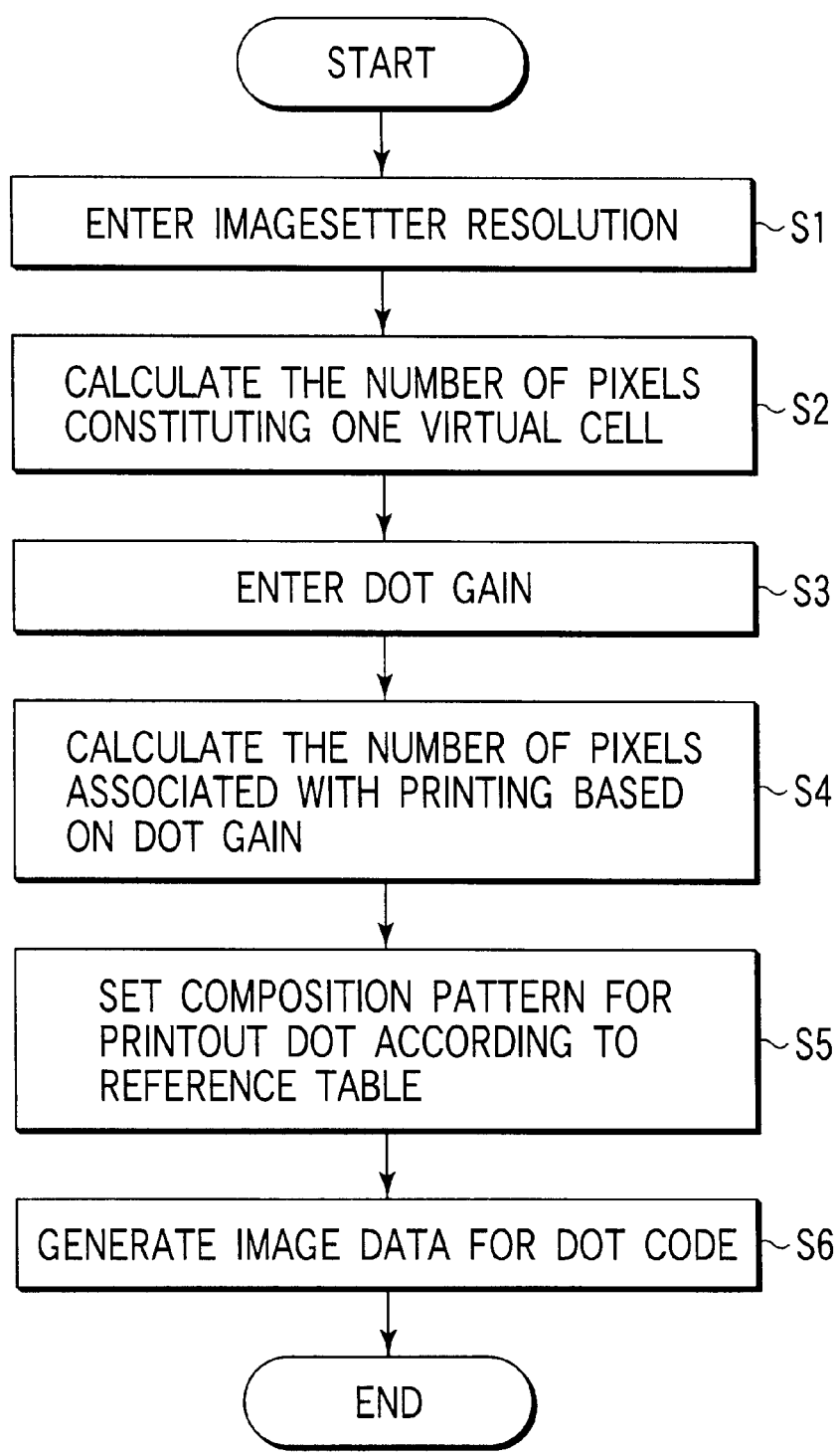
FIG. 7 is a flowchart explaining a method for creating image data comprising optically readable dots according to an embodiment of the present invention.
Figure 31:
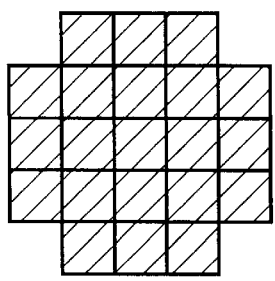
FIG. 31 shows a composition pattern for dot image data in order to minimize the above-mentioned dispersion value when the number of pixels (N) constituting a dot is 21.
Figure 32:
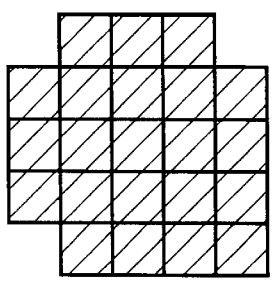
FIG. 32 shows a composition pattern for dot image data in order to minimize the above-mentioned dispersion value when the number of pixels (N) constituting a dot is 22.
Figure 33:
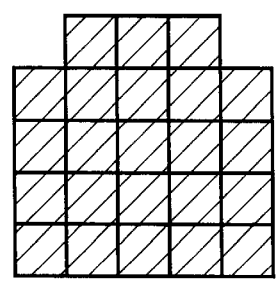
FIG. 33 shows a composition pattern for dot image data in order to minimize the above-mentioned dispersion value when the number of pixels (N) constituting a dot is 23.
Figure 34:
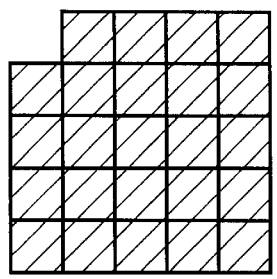
FIG. 34 shows a composition pattern for dot image data in order to minimize the above-mentioned dispersion value when the number of pixels (N) constituting a dot is 24.
Figure 35:
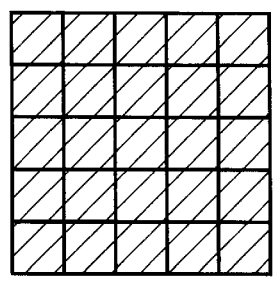
FIG. 35 shows a composition pattern for dot image data in order to minimize the above-mentioned dispersion value when the number of pixels (N) constituting a dot is 25.

An embodiment of the present invention will be described with reference to the accompanying drawings. First, The following describes a method for generating optically readable dot image data according to the embodiment of the present invention with reference to the flowchart in FIG. 7.

When an imagesetter resolution is entered at step S1, the number of pixels constituting one virtual cell is calculated according to the relevant imagesetter resolution at step S2. This step S2 is equivalent to a first process as described in the appended claims.

Assuming that n; number of pixels on one side of a virtual cell where n is an integer greater than or equal to 2, M; imagesetter resolution (dpi), Lmin; minimum dot pitch a reader can read, Lmax; maximum dot pitch a reader can read, and 25.4; one inch expressed in millimeters, A dot pitch a reader can read must be:

Lmin<25.4/M*n<Lmax

This equation is solved with respect to n as follows.

$Lmin*M/25.4 < n < Lmax*M/25.4$

Assuming that M=1200 dpi, and Lmin=55 µm and Lmax= 85 µm as minimum and maximum dot pitches the reader can read, the above-mentioned equation is expressed as follows.

2.6<n<4.02

For satisfying this equation, a value of n is 3 or 4.

Assuming that the virtual cell is formed in a tetragonal lattice, it is found that the cell must comprise 9 pixels (3 by 3) at a 63.5 µm dot pitch or 16 pixels (4 by 4) at a 84.7 µm dot pitch. The virtual cell should be configured to be 3 by 3 pixels at a smaller dot pitch when the dot recording density should take precedence with a smaller dot size. By contrast, the virtual cell should be configured to be 4 by 4 pixels at a larger dot pitch when the printout quality should take precedence over the dot recording density.

Then, an index for dot enlargement, namely a dot gain is input at step S3. The dot gain represents a ratio of an actual printout dot area to a pixel area on image data. The dot gain g is calculated as follows.

g=area of a dot to be printed/pixel area on image data

This value may be confirmed previously by printing a reference pattern.

The dot gain is actually determined by complex factors such as film output quality on, say, an image set copy generation apparatus and dot enlargement during printout on a printing device.

The following provides an example of a dot gain value. When 3 pixels associated with printing are placed on a virtual cell comprising 9 pixels (3 by 3 pixels), it is assumed that an area percent (k=60%) is obtained for minimizing an error during reading of a printed dot. Here, an area percent k is a value resulting from "an area where the dot is printed" divided by "a virtual cell area".

In this case, the dot gain g is calculated as follows.

g=0.6/(3/9)=1.8

Using the known g value, the following operation is performed to calculate the number of pixels M associated with printing (step S4). This step S4 is equivalent to a second process as described in the appended claims.

$M=n*n*k/g$

This equation is assigned n=3, k=0.6, and g=1.8.

M=3*3*0.6/1.8=3

The number of pixels M associated with printing is found to be 3.

According to a composition pattern reference table, control then advances to step S5 to reference the number of pixels M (found at step S4) associated with dot printing. This step S5 is equivalent to a third process as described in the appended claims. Composition pattern reference tables are shown in FIGS. 12A through 35. A process for finding composition patterns will be described later in detail.

The composition pattern corresponding to each dot is fitted to complete the image data as a dot code (step S6), thus terminating a series of processing.

FIG. 8 illustrates how to find the dispersion. FIG. 8 schematically shows performing area-integration on the square of the distance between a position of each pixel constituting a dot and a centroid position based on all pixels constituting the dot within all pixels constituting the dot.

In the composition pattern, a dispersion value D is calculated as follows.

$$D = \iint ((x-X0)^2 + (y-Y0)^2) dx dy \quad (1)$$

The following values are assumed.

X0=∬xdxdy: x coordinate a constituent pixel's centroid
Y0=∬ydxdy: y coordinate a constituent pixel's centroid
The integration range should be within a constituent pixel.

The following describes in detail a process for finding an optimal pattern out of a plurality of composition patterns for the dot image data with reference to FIGS. 9A through 11C. FIGS. 9A through 9C shows a composition pattern of the pixels on dot image data, FIGS. 10A through 10C shows a configuration of dot outputted from the imagesetter, and FIGS. 11A through 11C shows a configuration of printed dot.

This example explains a process for finding an optimal dot composition pattern by placing 3 pixels associated with printing in a virtual cell comprising 3 by 3 pixels, namely 9 pixels in total.

In these figures, a black dot means a centroid. A broken line shows a pixel pattern virtual cell constituting a dot.

When 3 pixels are associated with printing in FIGS. 9A through 11C, there are provided three types of available composition patterns of pixels as image data, namely L-shaped arrangements (corresponding to FIGS. 9A, 10A, and 11A), horizontal arrangements (corresponding to FIGS. 9B, 10B, and 11B), and vertical arrangements (corresponding to FIGS. 9C, 10C, and 11C). Each composition patterns on the image data in FIGS. 9A through 9C respectively correspond to dot shapes in FIGS. 10A through 10C on a film output from the imagesetter. The corresponding printed dot shapes are shown in FIGS. 11A through 11C.

Equation (1) according to FIG. 8 can be used to yield dispersion values 1.833, 2.50, and 2.50 corresponding to FIGS. 9A through 9C, respectively. With respect to printed dot shapes, it has become apparent that dots are printed like an approximate circle as shown in FIG. 11A and like ovals as shown in FIGS. 11B and 11C.

Dots printed with all of the above-mentioned composition patterns approximate to be circular. This is possibly because a surface tension of ink tends to be minimal when ink passes a blanket during a print process. It is supposed that the oval composition patterns in FIGS. 11B and 11C are affected by the original composition patterns.

Namely, the composition pattern in FIG. 9A is L-shaped on the image data, but becomes circular on an actual printout. The composition patterns in FIGS. 9B and 9C are rectangular on the image data, but become oval on an actual printout. A further experiment was carried out on the assumption that an optimal method for printing a circular dot uses a composition pattern which collects as many pixels as possible near the centroid of all constituent pixels for the dot image data.

The experiment proved that the above-mentioned assumption was correct.

As a method for reliably determining a composition pattern for dot image data, we found that an optimum composition pattern provides a minimum dispersion value obtained by performing area-integration on the square of the distance between a position of each pixel constituting a dot and a centroid position based on all pixels constituting the dot within all pixels constituting the dot.

As mentioned above, the composition patterns in FIGS. 9A through 9C provide dispersion values of 1.833, 2.50, and 2.50, respectively. When forming a composition pattern having 3-pixel dots, it is apparent that the optimum composition pattern is the L-shaped arrangement in FIG. 9A which minimizes the dispersion value.

A further detailed investigation revealed that the printed dot in FIG. 11C is thinner than that in FIG. 11B in a shorter direction of the oval. After an investigation into the film used for image set copy, shown in FIG. 10C, we confirmed that the oval is thinner in a shorter direction also on the film.

It also became clear that this thinning is commonly caused by a pixel which is isolated in a laser scan direction of the imagesetter. This phenomenon is supposed to be an energy loss because the laser goes off before and after that pixel. In order for the imagesetter to stably output a film, it is desirable to use a composition pattern which minimizes pixels isolated in the imagesetter's laser scan direction.

FIGS. 12A through 35 illustrate composition patterns for dot image data in order to minimize the above-mentioned dispersion value when the number of pixels (N) constituting a dot is 2 through 25.

In these figures, a horizontal direction corresponds to the imagesetter's laser scan direction.

First, FIGS. 12 through 29 (except those marked with B), FIGS. 16B, 21B, 24B, 28B, 29B, and FIGS. 30 through 35 show arrangements which minimize a dispersion value and provide the fewest number of pixels isolated in the imagesetter's laser scan direction.

By contrast, each figure marked with B in FIGS. 12 through 29 (except FIGS. 16B, 21B, 24B, 28B, 29B) forms a rotation symmetry against each of the above-mentioned composition patterns. These figures marked with B provide composition patterns which do not minimize a pixel isolated in the imagesetter's laser scan direction, namely contain one or more pixels isolated in the imagesetter's laser scan direction.

These composition patterns may be used if a film output from the imagesetter causes no thinning at an isolated dot as mentioned above.

If FIGS. 15A and 15B (N=5), for example, composition patterns 5a and 5b minimize a dispersion value. A rotation symmetry is formed between the composition patterns in FIGS. 15A and 15B. However, the composition pattern in FIG. 15A contains no pixel isolated in the imagesetter's laser scan direction. The composition pattern in FIG. 15B contains one pixel isolated in the imagesetter's laser scan direction. Accordingly, the composition pattern in FIG. 15A is preferable because no pixel is isolated in the imagesetter's laser scan direction.

Figure 36A:
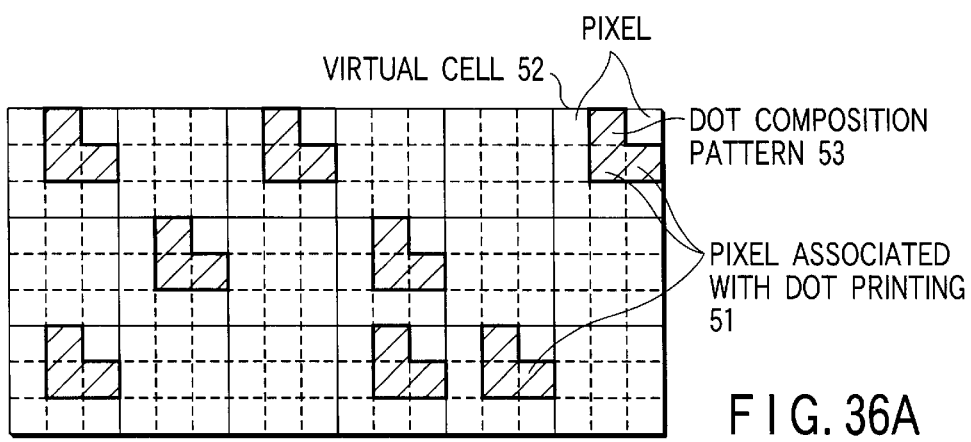
FIG. 36A represents image data as a dot code comprising optically readable dots in 3 by 6 virtual cells adjacently formed in a matrix.

FIG. 36A represents image data as a dot code comprising optically readable dots placed in 3 by 6 virtual cells adjacently formed in a matrix.

Each virtual cell comprises 9 (3 by 3) square pixels. Each virtual cell 52 is provided with a composition pattern 53 for the dot image data so that dots are printed when the digital data to be record corresponds to 1.

Here, the composition pattern in FIG. 13 is used. This pixel pattern minimizes the pixel dispersion when the number of pixels associated with printing is 3.

Figure 36B:
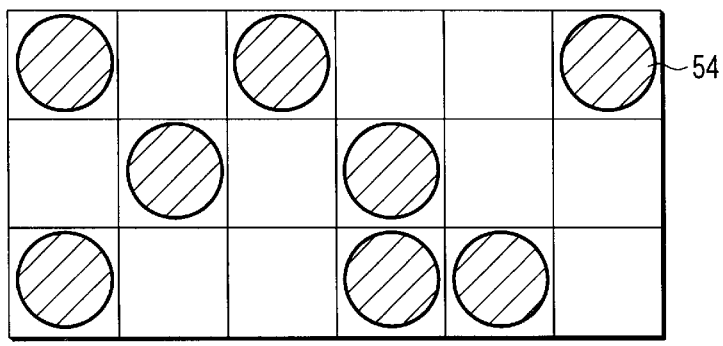
FIG. 36B shows how the dot code is printed.

Actually, a dot code as shown in FIG. 36B is printed. When the composition pattern 53 for the image data is compared to a corresponding printed dot 54, these shapes change so that they approximate to a circle. However, the centroid positions are unchanged.

The above explanation uses the virtual cell comprising n by n pixels, where n is an integer greater than or equal to 2. The present invention is not limited thereto.

For example, FIGS. 37A through 37C show configurations of virtual cells comprising non-square pixels.

FIG. 37A shows a honey-comb virtual cell 61. Namely, the virtual cell 61 comprises 4-by-4 densely and adjacently arranged square pixels and is configured so that the virtual cell 52 in FIGS. 36A and 36B slants just by 45 degrees.

FIG. 37B shows an example of a triangle grid. A virtual cell 62 comprises 16 equilateral triangle pixels. FIG. 37C shows a virtual cell 63 comprising 8 (2 by 4) square pixels.

Since basic system operation has been described, individual components and processes are now described in greater detail. It is FIG. 38 is a block diagram showing a configuration of a dot image data generation apparatus according to an embodiment of the present invention.

Figure 38:
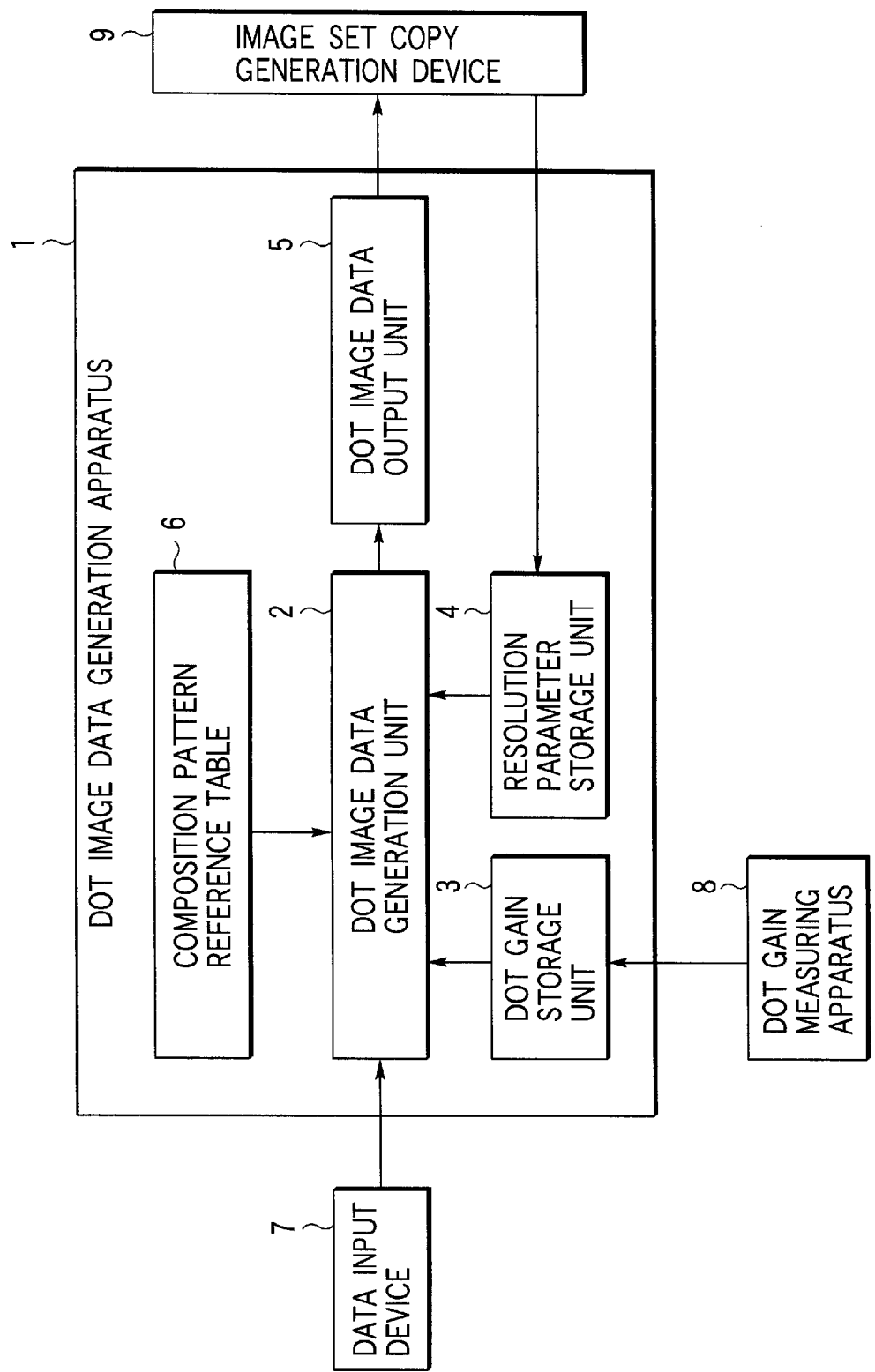
FIG. 38 is a block diagram showing a configuration of a dot image data generation apparatus according to an embodiment of the present invention.

According to a dot image data generation apparatus 1 as shown in FIG. 38, data such as voice is input from a data input device 7. The input data is converted to digital data comprising optically readable dots to be printed on a printout medium. For doing this, the input data is converted to dot image data corresponding to dots to be printed in virtual cells which are virtually formed on a printout medium. The converted data is output to an image set copy generation device 9 used for printing the image data.

The image set copy generation device 9 exposes data expanded to a raster image onto a film or directly on an image set copy. When the data is output to the film, this film is used to be further exposed onto the image set copy.

The image data generation apparatus 1 comprises a dot image data generation unit 2, a dot image data output unit 5, a dot gain storage unit 3, a resolution parameter storage unit 4, and a composition pattern reference table 6.

The dot image data generation unit 2 determines the number of pixels constituting a virtual cell based on a resolution parameter value stored in the resolution parameter storage unit 4. This operation is equivalent to the first process as described in the appended claims. The dot image data generation unit 2 then determines the number of pixels in a virtual cell associated with dot printing based on the obtained number of pixels constituting a virtual cell and a dot gain value stored in the dot gain storage unit 3. This operation is equivalent to the second process as described in the appended claims. The dot image data generation unit 2 references a composition pattern reference table 6 based on the obtained number of pixels in a virtual cell associated with dot printing. The dot image data generation unit 2 selects a composition pattern which minimizes dispersion of pixels constituting the dot image data. This operation is equivalent to the third process as described in the appended claims.

The dot image data generation unit 2 further converts data input from the data input device 7 to a given code format and transferring the data to the dot image data output unit 5.

The dot image data output unit 5 sends the dot image data by converting it to a format recognizable in the image set copy generation device 9.

The resolution parameter storage unit 4 stores a resolution parameter for the image set copy generation device 9. The resolution parameter is a resolution value corresponding to a minimum printout unit of the image set copy generation device 9.

Normally, the image set copy generation device 9 expresses a resolution parameter in the number of pixels per inch (25.4 mm), or dots per inch (dpi).

The dot gain storage unit 3 stores a dot gain value, namely a dot enlargement value measured in an external dot gain measuring apparatus 8.

There may be various methods for measuring enlargement of printed dots.

For example, a specified reference pattern is printed. This reference pattern is printed as a dot via the image set copy generation device 9 and a printer. An area of the printed dot is measured. This dot area is then compared with a total area of pixels associated with printing in the virtual cell.

The composition pattern reference table 6 is used for referencing an optimal dot composition pattern for printing. Specifically, this table contains composition patterns in FIGS. 9A through 36. By referencing this composition pattern reference table 6, it is possible to reference an optimal dot composition pattern based on the number of pixels associated with dot printing.

While there have been described specific preferred embodiments of the present invention, it is further understood by those skilled in the art that various changes and modifications may be made in the present invention without departing from the spirit and scope thereof.

For example, it will be obvious to those skilled in the art that a system or an apparatus may be provided with a storage medium which stores a software program code for implementing functions of the above-mentioned embodiment. A computer (CPU or MPU) of the relevant system or apparatus may implement these functions by reading and executing the program code stored in the storage medium.

In this case, the program code itself read from the storage medium implements the above-mentioned functions of the embodiment. The storage medium storing that program code constitutes the present invention. Available storage media for supplying the above-mentioned program code may include a floppy disk, a hard disk, an optical disk, a magnetic-optical disk, CD-ROM, CD-R, magnetic tape, A non-volatile memory card, ROM, and the like.

It is to be distinctly understood that the computer reads and executes the program code not only to implement the above-mentioned functions of the embodiment, but also to allow an OS (operating system) running on the computer to perform part or all of actual processing based on instructions from that program code and that the processing may implement the above-mentioned functions of the embodiment.

It is further believed obvious that the program code read from the storage medium is written to an expansion card inserted into the computer or to memory in an expansion unit connected to the computer, and then the CPU or the like in the expansion card or the expansion unit performs part or all of actual processing based on instructions from that program code and that the processing may implement the above-mentioned functions of the embodiment.

The above-mentioned of the present invention includes the following inventions.

(1) A method for generating optically readable dot image data when binary data corresponds to presence or absence of an optically readable dot and the dot is printed in a virtual cell virtually formed on a printout medium, comprising:

a first step of determining the number of pixels constituting the virtual cell as a minimum print unit in a typesetting device used for printing the dot on a printout medium;

a second step of determining the number of pixels in the virtual cell associated with printout of the dot in consideration of enlargement of the dot when printed on a printout medium based on the dot image data; and a third step of selecting a composition pattern which minimizes dispersion of pixels constituting the dot image data when a plurality of composition patterns is available as composition patterns for dot image data comprising the number of pixels determined by the second step.

This invention corresponds to FIGS. 7 through 38.

This invention allows to select a composition pattern which minimizes dispersion of pixels constituting the dot image data when determining the number of pixels in the virtual cell associated with dot printing. This makes it possible to uniquely choose an optimal dot composition pattern for printing dots from a plurality of composition patterns of the same number of pixels associated with dot printing independently of the number of pixels per virtual cell side or the number of pixels associated with dot printing. Using the composition pattern for minimizing dispersion of pixels constituting the dot can minimize the surface tension of an ink droplet on the image set copy during a printout process. Namely, it is possible to originally use a dot pattern (ink droplet shape) which minimizes the surface tension on the image set copy. Doing so can prevent the droplet shape from varying as much as possible for minimizing the surface tension and print a stable dot with a minimal deformation when an ink droplet is transferred to the blanket, then to paper during the printout process.

(2) The method for generating optically readable dot image data as described in item (1) above, characterized in that:

the third step selects a composition pattern which minimizes the dispersion based on a dispersion value found by performing area-integration on the square of a distance between a position of each pixel constituting the dot image data and a centroid position based on all pixels constituting the dot image data within all pixels constituting the dot image data.

This invention corresponds to FIG. 8.

Namely, this invention provides an actual equation for dispersion when determining a composition pattern which minimizes the dispersion in the third process above. A dispersion value for each composition pattern is found by performing area-integration on the square of the distance between a position of each pixel constituting a dot and a centroid position based on all pixels constituting the dot within all pixels constituting the dot. Defining such an equation can uniquely calculate a dispersion value for a given composition pattern. This makes it possible to uniquely choose an optimal dot composition pattern for printing dots from a plurality of composition patterns of the same number of pixels associated with dot printing.

(3) The method for generating optically readable dot image data as described in item (1) above, characterized in that:

the first step further determines a size of the virtual cell based on minimum and maximum dot distances which a reader optically reading the dot can read.

This invention corresponds to FIGS. 7 through 38.

Namely, according to this invention, the virtual cell size is determined on the basis of the minimum and maximum dot distances which an optical reader can read when dot image data is created. This makes it possible to create optimal image data depending on various readers.

(4) The method for generating optically readable dot image data as described in any one of items (1), (2), and (3) above, characterized in that:

when the typesetting device generates an image set copy by laser scanning exposure and there is provided a plurality of composition patterns selected by the third step, the third step further selects a composition pattern which minimizes the number of pixels isolated in a scanning direction of the laser out of a plurality of the composition patterns.

This invention corresponds to FIGS. 8 through 35.

Namely, according to the present invention, the above-mentioned third process further selects one composition pattern which minimizes the number of pixels isolated in the laser scan direction out of a plurality of composition patterns. Here, a pixel isolated in the laser scan direction whitens at its both sides. It has become apparent that such a pixel easily causes an irregular dot shape on a film according to various film development conditions such as types of films or developing solutions, laser exposure conditions, temperature, and the like. Accordingly, it is possible to output a film with uniformity and high reproducibility by minimizing the number of pixels isolated in the laser scan direction.

(5) The method for generating optically readable dot image data as described in any one of items (1) through (4) above, characterized in that:

the virtual cell comprises n-by-n square pixels, where n is an integer greater than or equal to 2, in the typesetting device.

This invention corresponds to FIGS. 8 through 35.

Namely, according to the present invention, the above-mentioned typesetting device uses a configuration of n by n square pixels, where n is an integer greater than or equal to 2. This makes it possible to use a general-purpose imagesetter for the typesetting device and easily create image data.

(6) The method for generating optically readable dot image data as described in any one of items (1) through (5) above, characterized in that:

there is adjacently formed a plurality of the virtual cell in a matrix.

This invention corresponds to FIGS. 36A and 36B.

Namely, according to the present invention, the relevant dot image data can be applied to a two-dimensional dot code by adjacently forming a plurality of the virtual cells in a matrix.

(7) An apparatus for generating optically readable dot image data, characterized in that:

an apparatus for generating optically readable dot image data when binary data corresponds to presence or absence of an optically readable dot and the dot is printed in a virtual cell virtually formed on a printout medium, comprising:

first means for determining the number of pixels constituting the virtual cell as a minimum print unit in a typesetting device used for printing the dot on a printout medium;

second means for determining the number of pixels in the virtual cell associated with printout of the dot in consideration of enlargement of the dot when printed on a printout medium based on the dot image data; and third means for selecting a composition pattern which minimizes dispersion of pixels constituting the dot image data when a plurality of composition patterns is available as composition patterns for dot image data comprising the number of pixels determined by the second means.

This invention corresponds to FIGS. 7 through 38.

This invention allows to select a composition pattern which minimizes dispersion of pixels constituting the dot when determining the number of pixels in the virtual cell associated with dot printing. This makes it possible to uniquely choose an optimal dot composition pattern for printing dots from a plurality of composition patterns of the same number of pixels associated with dot printing independently of the number of pixels per virtual cell side or the number of pixels associated with dot printing. Using the composition pattern for minimizing dispersion of pixels constituting the dot can minimize the surface tension of an ink droplet on the image set copy during a printout process. Namely, it is possible to originally use a dot pattern (ink droplet shape) which minimizes the surface tension on the image set copy. Doing so can prevent the droplet shape from varying as much as possible for minimizing the surface tension and print a stable dot with a minimal deformation when an ink droplet is transferred to the blanket, then to paper during the printout process.

(8) In order to generate optically readable dot image data when binary data corresponds to presence or absence of an optically readable dot and the dot is printed in a virtual cell virtually formed on a printout medium,
a computer-readable recording medium which stores programs including instructions for a computer to perform:
a first process for determining the number of pixels constituting the virtual cell as a minimum print unit in a typesetting device used for printing the dot on a printout medium;
a second process for determining the number of pixels in the virtual cell associated with printout of the dot in consideration of enlargement of the dot when printed on a printout medium based on the dot image data; and
a third process for selecting a composition pattern which minimizes dispersion of pixels constituting the dot image data when a plurality of composition patterns is available as composition patterns for dot image data comprising the number of pixels determined by the second process.

This invention corresponds to FIGS. 7 through 38.

This invention allows to select a composition pattern which minimizes dispersion of pixels constituting the dot when determining the number of pixels in the virtual cell associated with dot printing. This makes it possible to uniquely choose an optimal dot composition pattern for printing dots from a plurality of composition patterns of the same number of pixels associated with dot printing independently of the number of pixels per virtual cell side or the number of pixels associated with dot printing.

As mentioned above, according to this invention, using the composition pattern for minimizing dispersion of pixels constituting the dot can minimize the surface tension of an ink droplet on the image set copy during a printout process. Namely, it is possible to originally use a dot pattern (ink droplet shape) which minimizes the surface tension on the image set copy. Doing so can prevent the droplet shape from varying as much as possible for minimizing the surface tension and print a stable dot with a minimal deformation when an ink droplet is transferred to the blanket, then to paper during the printout process.

According to the present invention, it is possible to provide a method and an apparatus for generating optically readable dot image data and a recording medium, in which it is possible to select an optimal composition pattern out of a plurality of composition patterns for dot image data based on the number of pixels associated with printing even if a plurality of pixels constitutes a virtual cell for single dot image data and the virtual cell contains the specified number of pixels associated with actual printout of a single dot.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method for generating optically readable dot image data when binary data corresponds to presence or absence of an optically readable dot and said dot is printed in a virtual cell virtually formed on a printout medium, said method comprising:
a first step of determining a count of pixels constituting said virtual cell as a minimum print unit in a typesetting device used for printing said dot on the printout medium;
a second step of determining a count of pixels in said virtual cell associated with printout of said dot in consideration of enlargement of said dot when printed on the printout medium based on said dot image data; and
a third step of, when a plurality of composition patterns are available for the dot image data consisting of the count of pixels determined at the second step, selecting from the plurality of composition patterns a composition pattern which minimizes a dispersion value of pixels constituting said dot image data,
wherein said dispersion value is calculated for each of the composition patterns.

2. The method according to claim 1, wherein
said third step comprises selecting the composition pattern which minimizes said dispersion value by performing area-integration on a square of a distance between a position of each pixel constituting said dot image data and a centroid position based on all pixels constituting said dot image data within all pixels constituting said dot image data.

3. The method according to claim 2, wherein
when said typesetting device generates an image set copy by laser scanning exposure and there is provided a plurality of composition patterns selected by said third step,
said third step further selects a composition pattern which minimizes a count of pixels isolated in a scanning direction of said laser out of the plurality of said composition patterns.

4. The method according to claim 2, wherein
said virtual cell comprises n-by-n square pixels, where n is an integer greater than or equal to 2, in said typesetting device.

5. The method according to claim 2, wherein
a plurality of said virtual cells are adjacently formed in a matrix.

6. The method according to claim 1, wherein
said first step further determines a size of said virtual cell based on minimum and maximum dot distances which a reader optically reading said dot can read.

7. The method according to claim 1, wherein
when said typesetting device generates an image set copy by laser scanning exposure and there is provided a plurality of composition patterns selected by said third step,
said third step further selects a composition pattern which minimizes a count of pixels isolated in a scanning direction of said laser out of the plurality of said composition patterns.

8. The method according to claim 1, wherein
said virtual cell comprises n-by-n square pixels, where n is an integer greater than or equal to 2, in said typesetting device.

9. The method according to claim 1, wherein a plurality of said virtual cells are adjacently formed in a matrix.

10. An apparatus for generating optically readable dot image data when binary data correspond to presence or absence of an optically readable dot and said dot is printed in a virtual cell virtually formed on a printout medium, said apparatus comprising:

first means for determining a count of pixels constituting said virtual cell as a minimum print unit in a typesetting device used for printing said dot on the printout medium;

second means for determining a count of pixels in said virtual cell associated with printout of said dot in consideration of enlargement of said dot when printed on the printout medium based on said dot image data; and third means for, when a plurality of composition patterns are available for the dot image data consisting of the count of pixels determined by the second means, selecting a composition pattern which minimizes a dispersion value of pixels constituting said dot image data, wherein said dispersion value is calculated for each of the composition patterns.

11. A computer-readable recording medium having stored thereon program code for, in order to generate optically readable dot image data when binary data corresponds to presence or absence of an optically readable dot and said dot is printed in a virtual cell formed on a printout medium, instructing a computer to perform:

a first process for determining a count of pixels constituting said virtual cell as a minimum print unit in a typesetting device used for printing said dot on the printout medium;

a second process for determining a count of pixels in said virtual cell associated with printout of said dot in consideration of enlargement of said dot when printed on the printout medium based on said dot image data; and a third process for selecting a composition pattern which, when a plurality of composition patterns are available for the dot image data consisting of the count of pixels determined in the second process, minimizes a dispersion value of pixels constituting said dot image, wherein said dispersion value is calculated for each of the composition patterns.

* * * * *